United States Patent [19]

Mather et al.

[11] 4,151,828
[45] May 1, 1979

[54] SOLAR ENERGY COLLECTION TUBE

[75] Inventors: Phillip E. Mather; Scott T. Sherlock, both of Minneapolis, Minn.

[73] Assignee: Solarpower, Inc., St. Paul, Minn.

[21] Appl. No.: 810,869

[22] Filed: Jun. 28, 1977

[51] Int. Cl.² ............................ F24J 3/02; F16L 9/14
[52] U.S. Cl. ................................... 126/271; 138/148; 138/149
[58] Field of Search ............... 126/270, 271; 237/1 A; 138/148, 149; 285/190; 174/21 R

[56] References Cited
U.S. PATENT DOCUMENTS

| 1,855,815 | 4/1932 | Abbot | 126/271 |
| 1,946,184 | 2/1934 | Abbot | 126/271 |
| 1,989,999 | 2/1935 | Niederle | 126/271 |
| 3,976,508 | 8/1976 | Mlavsky | 126/271 |

Primary Examiner—James C. Yeung
Attorney, Agent, or Firm—Frederick A. Fleming

[57] ABSTRACT

A cylindrical metal tube is provided with an outer transparent jacket, the jacket being spaced apart from the tube by bushings at each end and sealed therewith by means of o-ring type elastomeric seals positioned in grooves in the bushings. The intermediate space between the tube and the jacket is evacuated through a side tube on the jacket to reduce heat loss from the surface of the tube due to convection of air. The solar energy collector tube of this invention is applicable to flat plate type collector installations as well as concentrating collectors such as those employing parabolic trough reflectors. The flow path of the heat transfer fluid is straight through the tube, affording simple manifolding of multiple solar energy collection tubes arranged in parallel to span a specified area of collection.

8 Claims, 3 Drawing Figures

SOLAR ENERGY COLLECTION TUBE

BACKGROUND OF THE INVENTION

1. Field of the Invention

The invention is a solar energy collection tube, per se, for use in a solar energy utilization system. There is no specific U.S. classification for such inventions, but the prior art is found chiefly in U.S. Class 126/270 Solar Heaters and U.S. Class 126/271 Solar Water Heaters.

2. Description of the Prior Art

It is well known that a fluid may be heated by circulating it through a blackened metal pipe that is exposed to the sun's rays. In addition to conducting heat into the circulating fluid for some useful purpose, the metal pipe or solar energy collecting tube as it may be called, tends to dissipate its heat by radiation to the surroundings and by conduction to the medium in contact with its outside surface (generally air), the conductive heat loss being exacerbated by convection currents. The prospect of avoiding this latter heat loss has induced many inventors to seek means of enclosing the collector tube in a transparent evacuated jacket.

Solar energy collector tubes having flow of a heat transfer fluid into one end of a metal tube and out of the opposite end of the tube, with a transparent jacket supported around the metal tube by means of spacers and with provision for evacuation of the free space intermediate the tubes, are disclosed in the following U.S. Patents:

U.S. Pat. No. 1,855,815 — 4/1932 — Abbot
U.S. Pat. No. 1,946,184 — 2/1934 — Abbot
U.S. Pat. No. 1,989,999 — 2/1935 — Niederle In such an assembly the inner tube tends to elongate differentially with respect to the outer jacket tube when the collector is put in service, due to the difference in coefficients of expansion of the two materials together with the fact that the inner tube tends to reach a higher temperature, so that a special problem is present in making the seals between the spacers and the tubes, so that the seals or tubes are not destroyed by the stresses set up in the assembly. In the 1932 patent to Abbot it is not apparent that the inventor was acquainted with this problem and the illustration of the seals does not suggest that the problem was solved. But in his 1934 patent, Abbot added a a metal bellows to the outer jacket, thereby introducing flexibility and supplying a solution to the differential elongation problem. The 1935 patent to Niederle does not acknowledge the problem and the illustrations do not suggest that his construction was operative in view of the problem.

In recent years, those who have sought to realize the improved efficiency of a vacuum jacketed collector tubes have used the Dewar flask or familiar vacuum bottle type construction, the now conventional approach which is seen in various forms in the following U.S. Patents:

U.S. Pat. No. 3,227,153 — 1/1966 — Godel et al.
U.S. Pat. No. 3,915,147 — 10/1975 — Rineer
U.S. Pat. No. 3,952,724 — 4/1976 — Pei
U.S. Pat. No. 3,983,861 — 10/1976 — Beauchaine
U.S. Pat. No. 4,002,160 — 1/1977 — Mather Jr., G. R.

In the above disclosures, the collecting tube is closed at one end and inserted into a glass tube also closed at one end, in the manner of placing a test tube inside a larger test tube. A spacing device of some form is employed to center the free end of the collecting tube and support it against inertial movement within the outer tube. At the open end of the collector tube, a hermetic "ring seal" is made and the space between the two tubes is evacuated in the factory via a temporary side tube which is then permanently sealed off. Note that a third tube must be included into the assembly, to carry the heat transfer fluid to the blind end of the collector tube for circulation, and that inlet and outlet tubes must be specially provided.

Such construction has the following disadvantages: (1) Introduction of the third tube entails inefficiencies due to (a) reflective radiant energy loss from the surfaces of the intermediate tube and (b) lag in heat transfer through the wall of the intermediate tube which is commonly of glass, a poor thermal conductor. (2) Since flow must enter and exit from the same end of the tube, the effective cross sectional area of the heat transfer fluid conduit is reduced by half for any given collector tube diameter, requiring (a) increased working pressure of the heat transfer medium and (b) increased performance specifications of the system, to withstand the higher working pressure. (3) The spacer element separating and supporting the intermediate tube within the outer jacket affords a path for conductive heat loss (albeit a small one) from the inner collector tube to the outer jacket. (4) Solar energy utilization systems generally employ multiple collection tubes arranged in parallel. The accessory manifolds for plumbing these connections are complex in design, since inlets and outlets are in close proximity and in some examples arranged concentrically (cf. U.S. Pat. No. 3,952,724 4/76 Pei). (5) The collector tube assembly is of complex design, having a ring seal, an inlet port, an outlet port and sometimes a graded metal to glass seal in close proximity (cf. U.S. Pat. No. 3,227,153 1/1966 Godel). Fabrication of such complex glassware is technically difficult and requires well-equipped glass manufacturer's facilities employed in the hands of skilled glass workers, and resulting in high unit costs. (6) The collector tube construction is inherently fragile by reason of its complexity and it is ill adapted for use in the hostile environment outdoors where it will be exposed to wind, rain, sleet, snow, ice and hail as well as the vandal's missiles. When a single collection tube in an installation is damaged, the entire system is disabled, and if a special heat transfer medium is employed, loss of the fluid will occur. In summary, the disadvantages of such systems include:

(1) Inefficiencies due to reflective loss and thermal lag.
(2) Reduced heat transfer fluid flow capacity or increased pressure specifications.
(3) Conductive heat loss by spacer element.
(4) Complicated manifolding.
(5) Technically difficult and expensive manufacture.
(6) Fragility and vulnerability.

The primary problem with vacuum jacketing a solar energy tube, the problem prior inventors have solved by use of bellows or by single-ended vacuum bottle type construction is that if one puts a vacuum jacket on a collector tube by the conventional means — typically, by means of "ring seals" at each end of the familiar straight through tube construction, the seals are subjected to great stresses when the inner tube elongates due to thermal expansion when it is placed in operation. The outer jacket, remaining relatively cold, does not elongate and is stressed in tension, resulting in fracture of the ring seals and loss of vacuum.

A second underlying problem is a methodological or philosophical one, the belief ingrained in contemporary practitioners of the inventive arts in solar energy, that any vacuum jacket must be evacuated just once in the factory and then sealed for use in the field.

SUMMARY OF THE INVENTION

The invention is a solar energy collection tube for use in a solar energy utilization system of the type employing a circulating heat transfer fluid, including "flat plate" and concentrating types of systems. In our preferred form of the invention, the collection tube is a straight thin-walled cylindrical metal tube with a transparent jacket, the space between the tube and the jacket being plugged at the two ends of the jacket by bushings sealed slidably thereto by means of elastomeric o-ring type seals positioned in annular grooves in the cylindrical surfaces of the bushings. Each bushing has one flange to limit its insertion into the jacket. The jacket has a tubular side arm for connection to a vacuum system when the collector tube is operating in a solar energy collection system.

The primary object of the invention is to produce a solar energy collection tube of simple construction which affords the higher efficiency offered by vacuum jacketing to diminish heat loss from the external surface of the heat absorbing tube. Another important object is to accomplish that objective with a rugged assembly having straight-through flow path of the heat transfer medium for ready connection to manifolds of the heat transfer fluid conduit system.

Our radiant energy collector tube solves the problem of differential expansion of the heat absorbing inner tube with respect to the outer vacuum jacket in a straight-through construction by affording seals which permit longitudinal excursion of the inner tube within the vacuum jacket. This is accomplished by means of flanged bushings which space apart the jacket from the absorbing tube and which hold o-ring type seals to seal the annular spaces between the bushing and the heat absorber tube on the inside and the jacket on the outside cylindrical surface. The flange on the bushing serves to limit the insertion of the bushing assembly into the jacket under the impetus of atmospheric pressure differential. Collars are removably attached to the heat absorber tube to hold the bushings from endwise movement along the heat absorber tube, completing the assembly.

The problem of maintaining a hard vacuum in the system is solved by permitting the vacuum pump to operate continually during the operation of the solar energy system, overcoming the tendency for diminution of vacuum and loss of efficiency due to slow leakage of the seals. It must be pointed out in this regard that modern high temperature silicone and fluorocarbon rubber compounds are applicable to production of high performance o-ring type seals which are substantially impermeable at the relatively high operating temperatures required in this application. It is also noted that mechanical vacuum pumps are available for production of the relatively hard vacuua required for efficient insulation. And it is finally noted that while the vacuum pump will demand power consumption during the initial stages of pumping down the system, that once the system is evacuated, the vacuum pump may run with minimal consumption of power, maintaining the vacuum. The recognition that it is feasible to operate the vacuum pump continuously during operation of the solar energy collection system, to make up for any losses which may occur through slow leakage through less than hermetic seals, constitutes a methodological "breakthrough."

The problems of the prior art single-ended solar energy collection tubes have been virtually eliminated. Referring to the numbered disadvantages of such systems as enumerated in the Description of the Prior Art, supra: (1) There is no intermediate tube for reflective loss of incident radiation and no intermediate insulator to cause thermal lag from the heat receiving surface to the heat transfer medium. Instead, the radiant energy, after passing through the vacuum jacket then impinges directly on the absorber tube where it is absorbed and converted to heat, the heat being quickly thermally conducted through the thickness of the metallic heat absorber tube and received by the relatively cold heat transfer medium circulating therethrough. (2) The full cross-sectional area of the heat absorber is open for flow of the heat transfer fluid, doubling the capacity of the tube relative to the single ended type or alternatively, providing the same capacity at reduced pressure in the heat transfer fluid system. (3) There are no spacers to conduct heat from the inner tube to the jacket within the working area of the assembly. (4) Multiple heat collector tubes may be connected in parallel by means of manifolds of simple construction. (5) Manufacture of the parts of the collector tube of our invention is within the capacity of unskilled and semi-workers. The bushings may be of machined metal or molded ceramic or high temperature structural polymer. Attachment of the tubular side arm to the jacket is the only operation calling for glassblowing skills. (6) The completed solar energy collector tube assembly is rugged, its two ends affording connection ports to the heat transfer fluid system. Fracture of the outer glass jacket while the collection tube is in service does not result in complete breakdown of the system but merely results in impaired efficiency until repairs can be made. No loss of heat transfer fluid results from fracture of the vacuum jacket. For installations subject to severe conditions of weather or vandalism, heavy-walled glass pipe may be employed for the jacket.

Another advantage of the solar energy collector tube of the invention is that within a given installation, the component parts of the collection tubes are interchangeable. Parts subject to breakage or deterioration may be replaced with parts from stock.

Still another advantage of the solar energy collector tube of our invention is that the units may be made to any manageable size, to accommdate collector systems of various capacity.

The solar energy collection tube of our invention may be used in closely ranked parallel arrays for "flat plate " applications comparable to that illustrated by U.S. Pat. No. 3,952,724 6/1974 to Pei and U.S. Pat. No. 4,002,160 1/1977 to Mather. It may also be used in concentrating solar energy collectors such as that illustrated by U.S. Pat. No. 3,915,147 10/1975 to Rineer, in which parabolic reflectors are used to direct the sun's rays from a large rectangular area to the collecting tube, and that illustrated in the literature of Northrup, Inc. 302 Nichols Drive, Hutchins, Texas 75141, in which a collector lens is used to refract the rays toward the collector tube.

Such systems may be used for any purpose employing solar energy. The heat transfer fluid circulated in the system may simply be air, for such applications as drying grain, or it may be a chemically inert heat transfer fluid designed for operation at 300-400 degrees Fahrenheit, for use with a concentrating type collection system, in which the heated fluid may be circulated through a heat exchanger to produce steam to drive a turbine or the like.

DESCRIPTION OF THE PREFERRED EMBODIMENT

Figure 1:
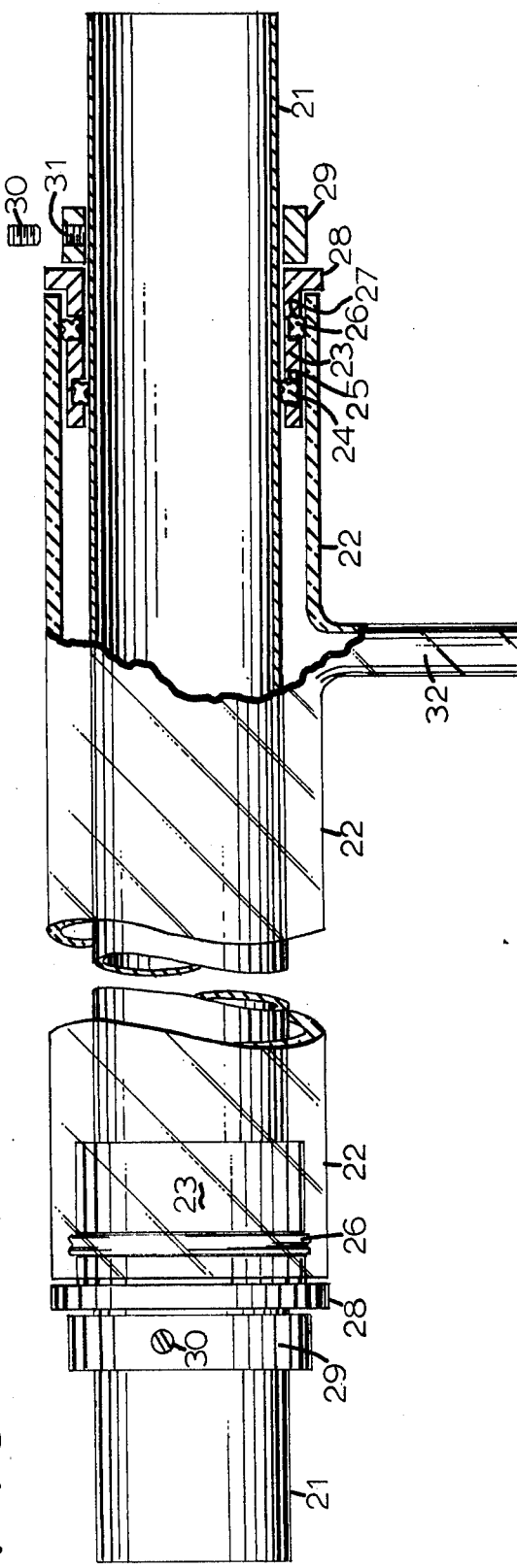
FIG. 1 is a side elevation, partly broken away and partly in section and with an intermediate section removed to permit fitting the drawing on the paper, of a solar energy collecting tube constructed according to our invention.

The preferred embodiment of our solar energy collection tube (FIG. 1) is made up of a straight clyindrical thin-walled metal tube 21 on which is assembled a transparent outer jacket 22 (typically of hard glass such as Pyrex brand), the jacket 22 being spaced symmetrically apart from the tube 21 by means of a pair of identical bushings 23 (FIG. 2), one each near each end of the tube 21, inserted within the jacket 22. A flange 28 on each bushing 23 limits the extend that the bushing 23 may enter the space between the jacket 22 and the tube 21, by interference of the flange 28 with the ends of the jacket 22. An appreciable dimensional tolerance is provided between the inner diameter of the bushing 23 and the outer diameter of the tube 21, and a similar tolerance is provided between the outer diameter of the bushing 23 and the inside diameter of the jacket 22.

An annular groove 25 in the inside circumference of the bushing 23 accommodates an o-ring type seal 24 which compressively fills the adjacent annular space next to the tube 22 and establishes a virtually leak-free barrier thereinbetween. Similarly, a groove 27 on the outside circumference of the bushing 23 accommodates an o-ring type seal 26 which likewise affords a barrier between the bushing 23 and the jacket 22.

Figure 2:
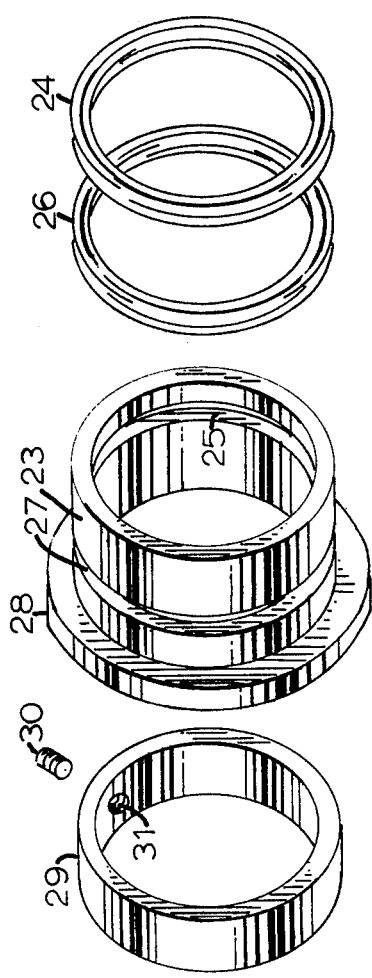
FIG. 2 is an exploded perspective view of the parts of the invention which make up the bushing and the seal, together with the end collar.

The o-ring type seals employed in this application may be of conventional circular cross section or of the four-lobes variety illustrated in FIGS. 1 and 2 or of other selected cross section to afford the most satisfactory operation. Seals of silicone and fluorocarbon rubber are available for operation at temperatures of 300-400 degrees Fahrenheit and lubricants selected from the silicone and fluorocarbon greases may be applied to promote extended operating life.

After the jacket 22 is assembled on the tube 21 by means of the two bushings 23 containing seals 24, 26, the location of the jacket with respect to the long dimension of the tube is established by fastening means such as the pair of collars 29 (FIG. 1), one collar at each end of the tube 21, the collars 29 being fixed to the tube 21 by means such as the set screw 30 tightened within the threaded aperture 31 in the collar. In fixing the position of the collars 29 a space for contraction may be provided by the use of a feeler gauge between the end of the bushing 23 and the collar 29, or a spring washer (not illustrated) may be inserted between the bushing 23 and the collar 29.

The solar energy collection tube, thus assembled, may be installed in a solar energy collection system by connecting the ends of the tube 21 to the heat transfer fluid conducting system, using conventional connecting means such as compression fittings (not illustrated).

A tubular side arm 32 on the jacket 22 (FIGS. 1, 3) is then connected to a manifold 33 (cf. FIG. 3) of a vacuum system by means of a coupling element 34 which may be a short length of vacuum tubing coated with glyptal varnish.

When the sun's rays strike the heat absorbing tube 21 it will tend to lengthen with respect to the outer jacket 22. Doing so, the tube 21 will travel slightly within the seals 24 and the spaces between the collars 29 and the bushings 23 will increase slightly. The bushings 23 will maintain close contact with the ends of the vacuum jacket due to the action of atmospheric pressure.

In addition to the longitudinal expansion, the tube 21 and the bushings 23 will expand diametrically, tending to stress the circumferential integrity of the ends of the jacket 22. The tolerances which we allow between the outside diameter of the bushing 23 and the inside diameter of the jacket, together with the specifications of the groove 27 and the o-ring type seal 26 are selected so that the incipient hoop stresses are harmlessly dissipated in deformation of the elastomeric o-ring type seal 26.

Figure 3:
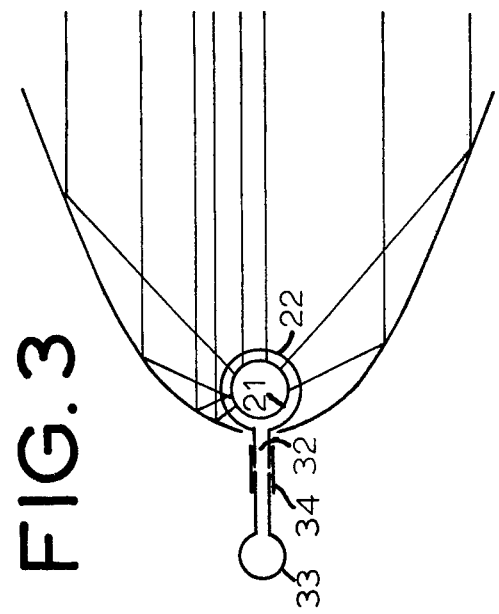
FIG. 3 is a schematic illustration showing a cross section of the solar energy collecting tube positioned within a parabolic reflector, the parallel lines originating from the right side indicating rays from the sun.

In a parallel array of our solar energy collection tubes, the vacuum side arms 32 may be orientated either rearward of the direction of the sun, as illustrated in FIG. 3 for an installation employing parabolic reflector concentration, or directly forward as in "flat plate" collection systems. In the latter assembly, the vacuum manifold casts a small shadow on the collection tube. In applications employing parabolic reflectors or other concentrating optics, it is desirable to manage the geometry of the system to avoid focusing radiant energy directly upon the ends of the collector tubes or at the bushings 23; radiant energy impingement should be limited to the working length of the collector tube, the zone between the bushings 23.

To facilitate the effective capture of radiant energy falling on the tube 21, we prefer to employ tubes 21 which have received a permanent blackening treatment such as black chrome electroplate. With the expansion of technical developments in surface treatments of metals to facilitate absorption while diminishing emmission, such surface treatments may be substituted for the black chrome electroplate. It may be noted that the absence of corrosive gases within the vacuum jacket 22 promotes the integrity of the black chrome surface of the tube 21.

I claim:

1. A solar energy collection tube for use in solar energy utilization systems of the flat plate or the concentrating type, comprising the following combination of elements:

an inner tube, being an elongate cylindrical tube, an outer jacket for the inner tube, the jacket being an elongate transparent cylindrical tube of greater diameter than the inner tube but of shorter length, to permit the ends of the inner tube to extend from the jacket when centered therewithin, and the outer jacket having a tubular side arm for connection to a vacuum system, a pair of identical bushings, one each being insertable into each end of the outer jacket in the annular space between the inner tube and the outer jacket, to space the jacket concentrically around the inner tube, each bushing having one external flange to limit the extent of insertion by interference with the outer jacket, seal means, to seal the annular spaces between each bushing and the inner tube and to seal the annular spaces between each bushing and the outer jacket, the seal means providing limited travel of the inner tube within the bushings, and fastening means, to restrict the endwise travel of the bushings on the inner tube, to prevent inadvertent disassembly of the above elements of the solar energy collection tube.

2. A solar energy collection tube as in claim 1 wherein the inner tube is of metal tubing selected from the group: steel, Monel, Hastalloy, copper and brass.

3. A solar energy collection tube as in claim 1 wherein the outer jacket is of transparent material selected from the group: thermally resistant glass (such as PYREX), acrylic plastic and polycarbonate plastic.

4. A solar energy collection tube as in claim 1 wherein the bushings are fabricated from a structural material selected from the group: steel, aluminum, brass, monel, Hastalloy, copper, glass, ceramic, fluorocarbon polymer, and polycarbonate polymer.

5. A solar energy collection tube as in claim 1 in which the seal means is achieved by the use of o-ring type annular elastomeric elements contained partly within grooves fabricated in the outer and inner cylindrical surfaces of the bushings, at least one sealing o-ring being contained in at least one such groove on each cylindrical surface of each bushing.

6. A solar energy collection tube as in claim 5 in which the elastomeric o-ring seals are fabricated of high performance silicone or fluorocarbon elastomeric compound.

7. A solar energy collection tube as in claim 5 in which the cross section of the o-ring type seal is selected from the group: circular, four-lobed, six-lobed.

8. A solar energy collection tube as in claim 1 in which the fastening means to restrict endwise travel of the bushings is selected from the group: an annular collar fixed to the inner tube by means of a set screw; a snap ring, compressed in an annular groove on the inner tube.

* * * * *